No. 797,156. PATENTED AUG. 15, 1905.
W. TARRANT.
NAILLESS HORSESHOE.
APPLICATION FILED MAR. 2, 1904.
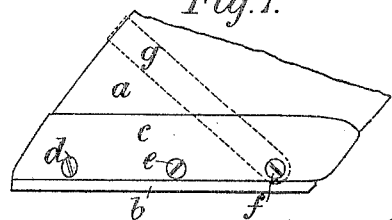
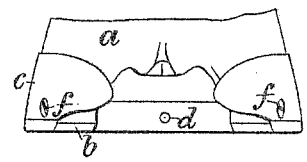
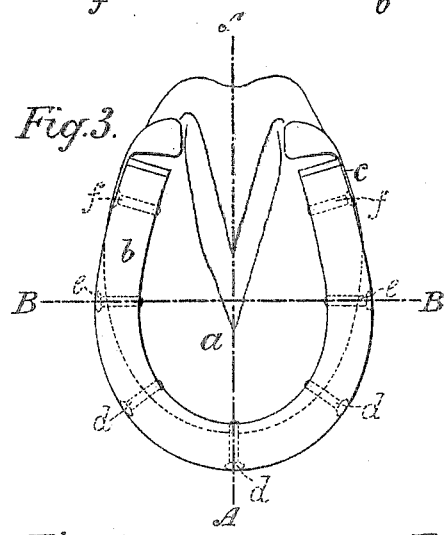
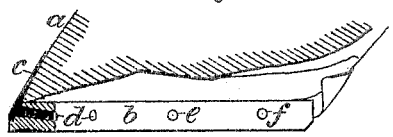
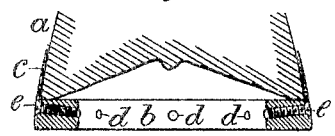
Witnesses:
Inventor
William Tarrant
by Richards & Co.
Attys

UNITED STATES PATENT OFFICE.

WILLIAM TARRANT, OF ESTCOURT, NATAL.

NAILLESS HORSESHOE.

No. 797,156.  Specification of Letters Patent.  Patented Aug. 15, 1905.

Application filed March 2, 1904. Serial No. 196,149.

*To all whom it may concern:*

Be it known that I, WILLIAM TARRANT, a subject of the King of Great Britain, residing at Estcourt, in the Colony of Natal, have invented new and useful Improvements in and Connected with Nailless Horseshoes, of which the following is a specification.

This invention relates to shoes for horses and other animals having similarly-shaped hoofs and means for connecting or securing shoes to and retaining them in place on the hoofs without driving nails or screws or holdfasts or other fastenings into the hoofs, the main object of the improvements constituting the said invention being to provide a bearing for the connecting means against the parts of the hoof on either side of the heel-cleft sufficient to insure security of the shoe on the hoof without such absolute rigidity as would cause moderate growth of the hoof to be attended by objectionable pressure on the said parts.

According to the said invention the provision for securing and retaining the shoes in place on the hoofs consists, essentially, of a band of metal (preferably spring-steel) forming an upwardly-projecting rim around the outer edge of the shoe and having a configuration corresponding to that of the outer face of the whole of the lower part of the hoof which the shoe is designed for application to. The said band when the shoe is in place on the hoof, therefore, bears fairly at all parts thereon from edge to edge of the heel-cleft, and thus securely clasps the hoof and binds the shoe to it.

The said invention is hereinafter further described with reference to the accompanying drawings, which illustrate several views of a shoe having the aforesaid improvements applied to it and in conjunction with the lower portion of a horse's hoof.

Figures 1 and 2 of the said drawings are respectively a side and back elevation; Fig. 3, a plan of under side; and Figs. 4 and 5, sections taken, respectively, on the lines A A and B B, Fig. 3.

In all the said figures the portion of the hoof shown is marked $a$, the shoe $b$, and the band forming the upwardly-projecting rim $c$. The lower edge of the forward and side portions of the said band $c$ fits in a recess formed around the outer edge of the shoe, and the said band is secured to the shoe by means of screws $d$ $d$ $e$ $e$ $f$ $f$, the shanks of which engage in tapped holes in the shoe and the heads of which lie in countersunk holes in the said band. As illustrated in Figs. 2, 3, and 4, the said band is at all parts of the same configuration as the part of the hoof with which it is in contact, and the ends of the said band which project beyond the rear parts of the shoe are curled inward, so as to bear fairly against the heel parts of the hoof, and the said band is of such length that it extends round the hoof from one edge to the other of the heel-cleft.

In applying the shoe to a hoof the screws $f$ $f$ are removed and the portions of the band $c$ which extend rearward beyond the screws $e$ $e$ at the two sides of the shoe are sprung outward, and the shoe is properly placed on the hoof. The outwardly-sprung portions of the said band $c$ are then pressed home, and the screws $f$ $f$ are replaced. The shoe is thus bound to the hoof by the band $c$, which so clasps the hoof as to prevent disengagement without removal of the screws $f$ $f$. The curled portions of the band $c$ which project beyond the rear ends of the shoe $b$ and bear against the parts of the hoof immediately adjacent to the heel-cleft effectually prevent rearward movement of the hoof on the shoe without objectionably rigid pressure on the said part. The aforesaid band $c$ is hereinafter termed the "retaining-rim" band.

When the hoofs of the animal to be shod are unsound—as, for instance, when they have been damaged by nailing shoes thereto in the ordinary manner—a supplementary band of metal or other suitable material is provided for bearing on the upper part of the hoof, which supplementary band is secured to the shoe in the position indicated in broken lines at $g$ in Fig. 1 by passing the screws $f$ $f$ through holes in its ends.

Where desired, pads of india-rubber or leather or other suitable compressible material may be used in the ordinary manner in conjunction with shoes provided with the means hereinbefore described for securing them to the hoofs, and where the band $g$ is used the inner side thereof may be faced with such a material.

Shoes provided with the means hereinbefore described for securing and retaining them in place on the hoofs may be roughed in frosty weather by means of headed screw-studs secured in tapped holes in them.

What I claim as my invention, and desire to secure by Letters Patent of the United States, is—

1. A nailless shoe consisting of a shoe proper made in one piece and having a flat upper face, and an upwardly-projecting rim-band for connection to the hoof formed of one piece of sheet metal around the outer edge of the shoe proper, and connecting-screws passed through holes in the said band and engaged in tapped holes in the edge of the shoe, the said band having inwardly-curled resilient rearward prolongations free at their ends extending beyond the most rearward of the connecting-screws and having the configuration of the outer face of so much of the lower portion of the hoof as extends from the rearward part of the sides thereof into the heel-cleft so as to prevent shifting of the hoof on the shoe in a rearward direction, substantially as hereinbefore described.

2. Means for securing a shoe to the hoof of a horse or similarly-hoofed animal without nailing, consisting of a metal band having holes near one edge admitting of its connection to the shoe by screws entering the edge of the shoe, and curled end portions, each having the configuration of the outer face of so much of the lower portion of a hoof as extends from the rearward part of the sides thereof into the heel-cleft, substantially as hereinbefore described.

In testimony whereof I have signed my name to this specification in the presence of two subscribing witnesses.

WILLIAM TARRANT.

Witnesses:
JOHN GARDOM WOOD,
GIOVANNI CALDERINI.